(12) United States Patent
Bonacini

(10) Patent No.: US 6,443,206 B1
(45) Date of Patent: Sep. 3, 2002

(54) MACHINE FOR MOUNTING AND REMOVING SPECIAL TIRES

(75) Inventor: Maurizio Bonacini, Correggio (IT)

(73) Assignee: Giuliano S.r.l., Correggio (IT)

( * ) Notice: Subject to any disclaimer, the term of this patent is extended or adjusted under 35 U.S.C. 154(b) by 0 days.

(21) Appl. No.: 09/496,726

(22) Filed: Feb. 2, 2000

(30) Foreign Application Priority Data

Feb. 4, 1999 (IT) ......................................... MO99A0015

(51) Int. Cl.[7] .................................................. B60C 25/135
(52) U.S. Cl. ..................................... 157/1.24; 157/1.28
(58) Field of Search ............................. 157/1.17, 1.24, 157/1.26, 1.28

(56) References Cited

U.S. PATENT DOCUMENTS

| | | | | |
|---|---|---|---|---|
| 3,528,475 A | * | 9/1970 | Duquesne | 157/1.24 |
| 4,694,875 A | * | 9/1987 | Goebel | 157/1.24 |
| 4,784,203 A | * | 11/1988 | Weiden | 157/1.24 |
| 4,986,328 A | * | 1/1991 | Metzger | 157/1.28 X |
| 5,226,465 A | * | 7/1993 | Schon et al. | 157/1.28 |
| 5,758,703 A | * | 6/1998 | Mimura | 157/1.28 |
| 5,836,368 A | * | 11/1998 | Corghi | 157/1.24 |
| 6,109,327 A | * | 8/2000 | Gonzaga | 157/1.28 |

* cited by examiner

*Primary Examiner*—James G. Smith
(74) *Attorney, Agent, or Firm*—Wolf, Greenfield & Sacks, P.C.

(57) ABSTRACT

A machine for mounting and removing special tires consisting of a floor-mounted turret which supports a unit for coupling and turning wheels provided with the special tires and a device for transversely pushing the beads of the tires, the device being provided with means for adjusting its intervention position.

16 Claims, 7 Drawing Sheets

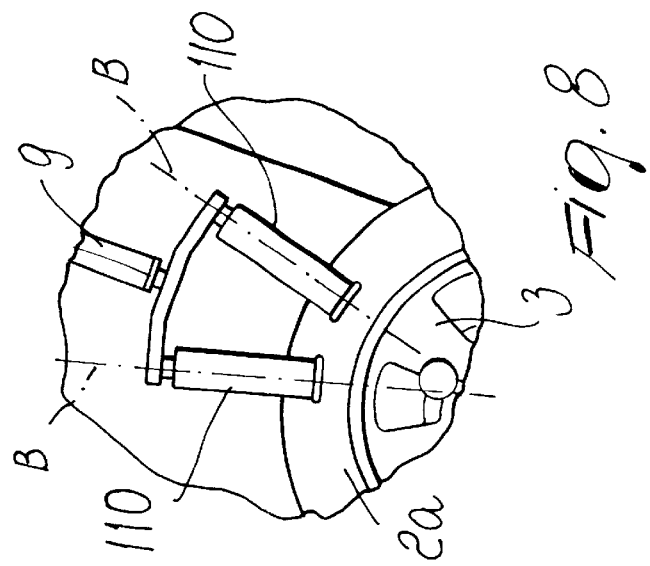
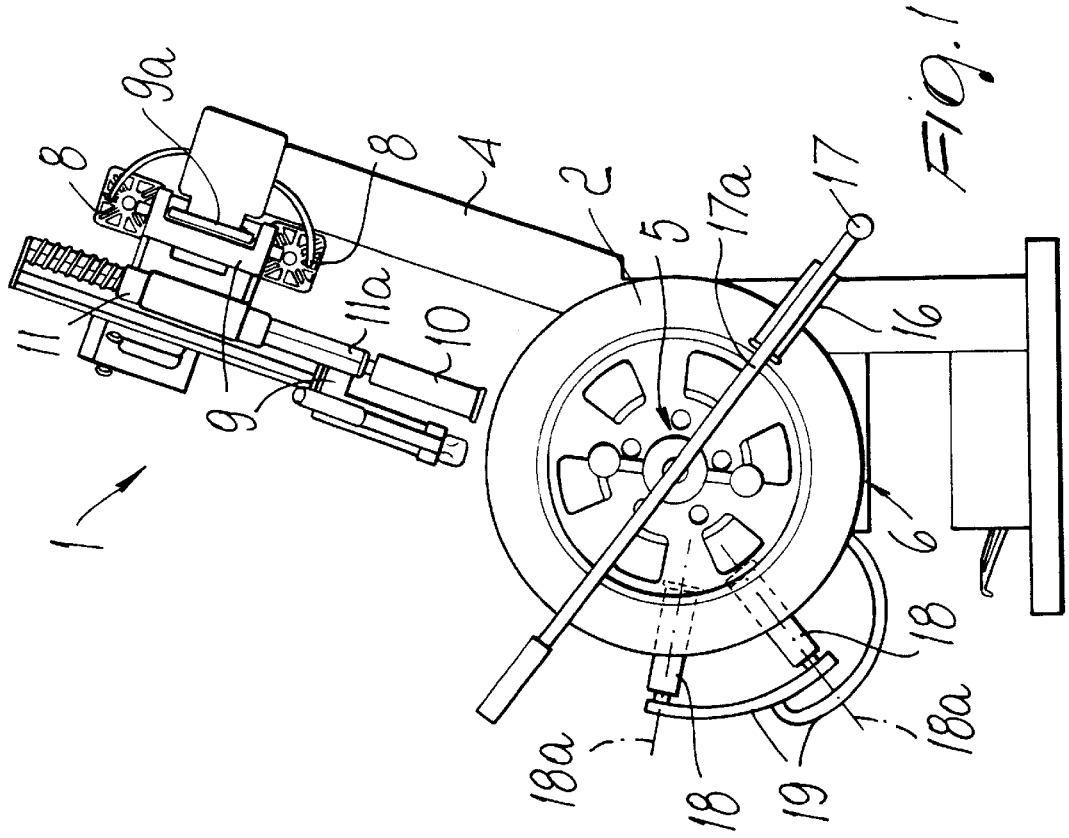

MACHINE FOR MOUNTING AND REMOVING SPECIAL TIRES

CROSS-REFERENCE TO RELATED APPLICATIONS

This application claims priority to Italian Application Serial No. MO99A0015 filed Feb. 4, 1999, the disclosure of which is incorporated herein by reference.

BACKGROUND OF THE INVENTION

The present invention relates to a machine for mounting and removing special tires.

So-called special tires are being marketed which are capable of retaining their rolling ability even in case of puncture.

In practice, these tires are mounted on a specifically provided wheel rim, in the bead seat of which a ring of elastomeric material of adequate thickness is fitted and fixed. In case of puncture, because of the deflation of the tire, the ring rests on the ground, prevents the tire from being crushed and maintains the directional capability of the steering axle of the vehicle, improving the users' safety.

These special tires have structural characteristics which are not part of the standard features of normal tires; first and foremost, they have different diameters for the inner and the outer sidewalls, the former being greater than the latter.

Moreover, the beads define, on both sidewalls, rings for retention and resting against the corresponding edges of the wheel rim. These rings are internally reinforced with a steel cable which is adapted to prevent their radial deformation.

Mounting and removing the special tires on and from the respective wheels currently require, indeed because of their particular structure, operations which are performed manually by using levers which, in addition to the efforts that operators must perform and to the long time required for these operations, often risk damaging the wheel rim.

In order to remove the beads of the tire from their seat when the tire is deflated, the levers are in fact inserted between the lateral ring of the tire and the corresponding edge of the wheel rim, on which the lever is then rested in order to provide a fulcrum to apply force so as to lift and extract the bead.

Likewise, during mounting the tire is fitted onto the wheel rim from the sidewall that has the largest diameter and the beads are pushed manually, optionally with the aid of a hammer, into the seating channel.

SUMMARY OF THE INVENTION

The aim of the present invention is to solve the above-described problems of the prior art, providing a machine for mounting and removing special tires which allows to perform the above-described operations automatically, rapidly and without damaging the wheel rims.

Another object of the present invention is to provide a machine for mounting and removing special tires which has a simple structure, operates satisfactorily and is low in cost.

This aim, this object and others are achieved by a machine for mounting and removing special tires, characterized in that it comprises a floor-mounted turret which supports a unit for coupling and turning wheels provided with special tires, and a device for transversely pushing beads of the tires, the device being provided with means for adjusting the intervention position.

BRIEF DESCRIPTION OF THE DRAWINGS

Further characteristics and advantages of the present invention will become apparent from the following description of a preferred embodiment of a machine for mounting and removing special tires, illustrated only by way of non-limitative example in the accompanying drawings, wherein:

FIG. 1 is a front view of the machine for mounting and removing special tires according to the invention;

FIG. 8 is a detail view of a possible alternative embodiment of a transverse pusher.

DESCRIPTION OF THE PREFERRED EMBODIMENTS

Figure 2:
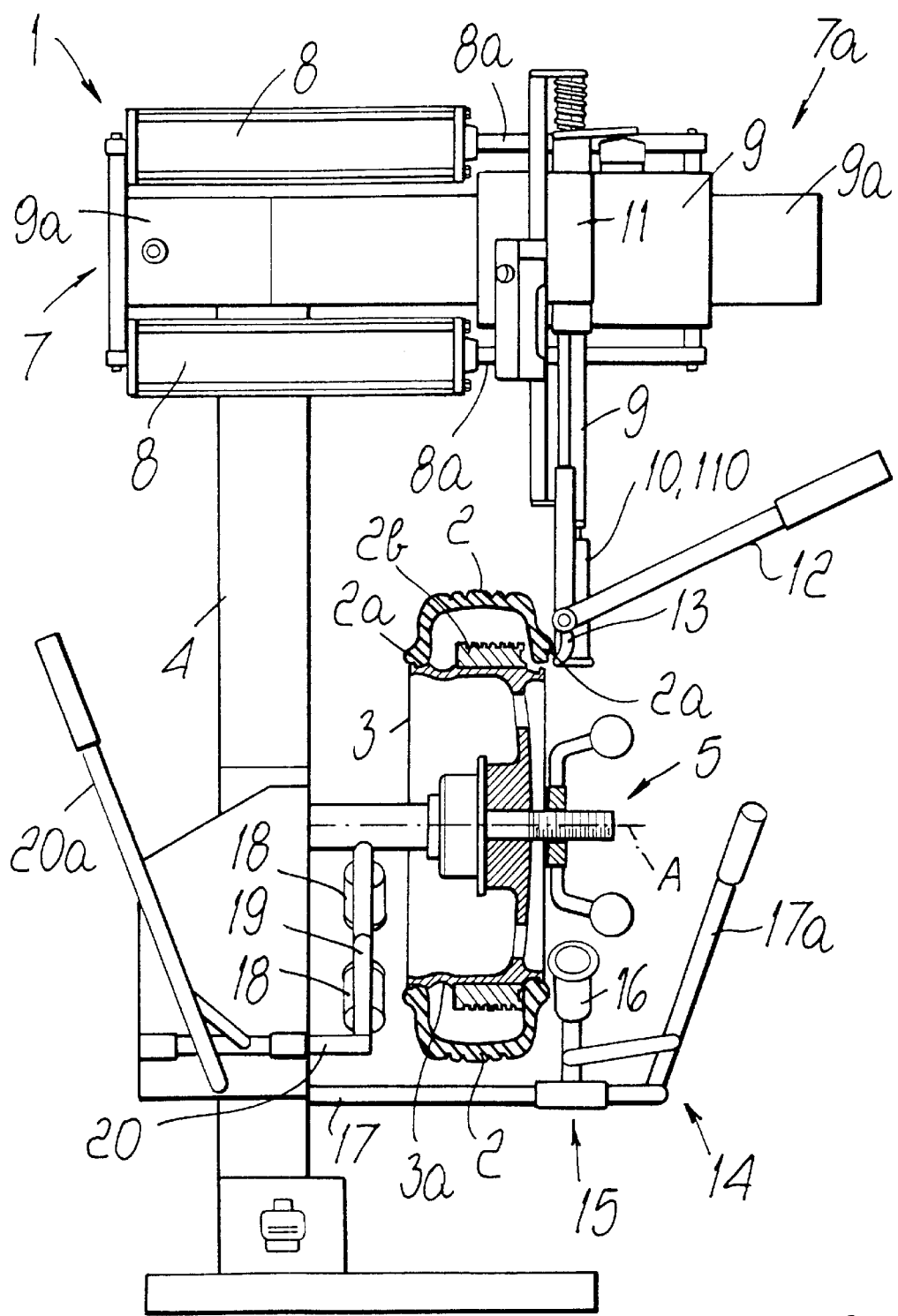
FIG. 2 is a corresponding side view thereof.
Figure 3:
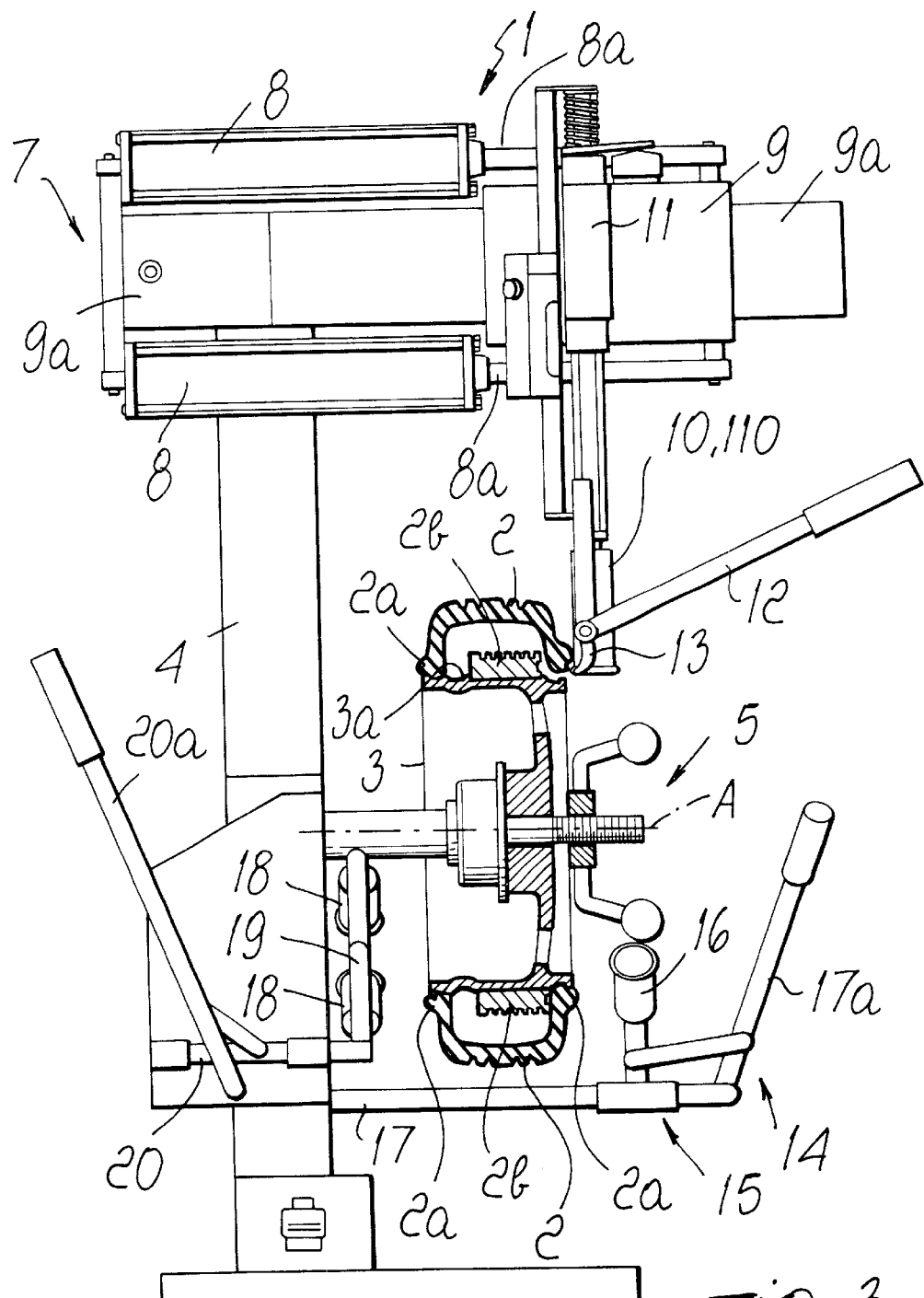
FIGS. 3 and 4 are side views of two steps of the removal of a special tire from its wheel rim.
Figure 4:
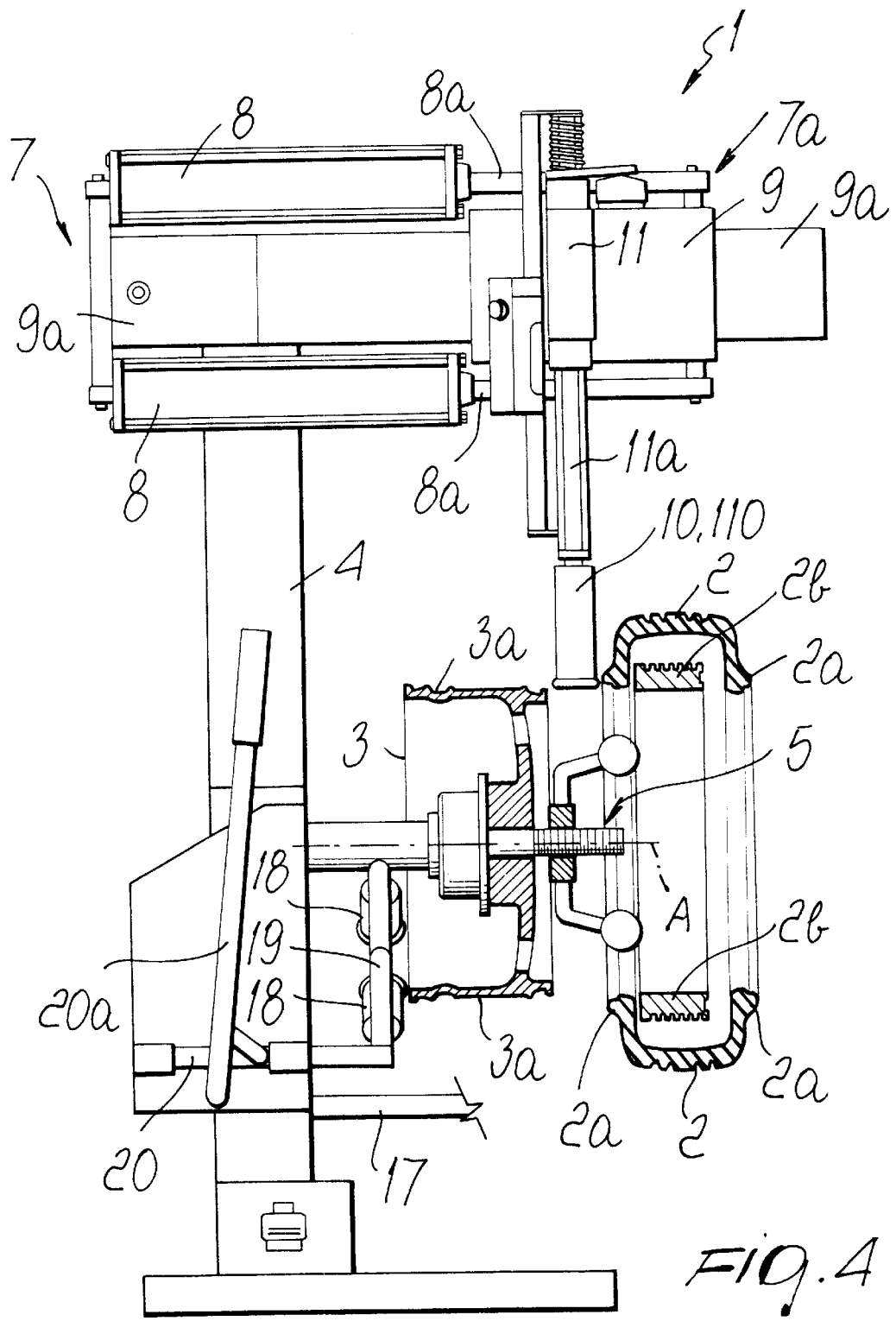
Figure 5:
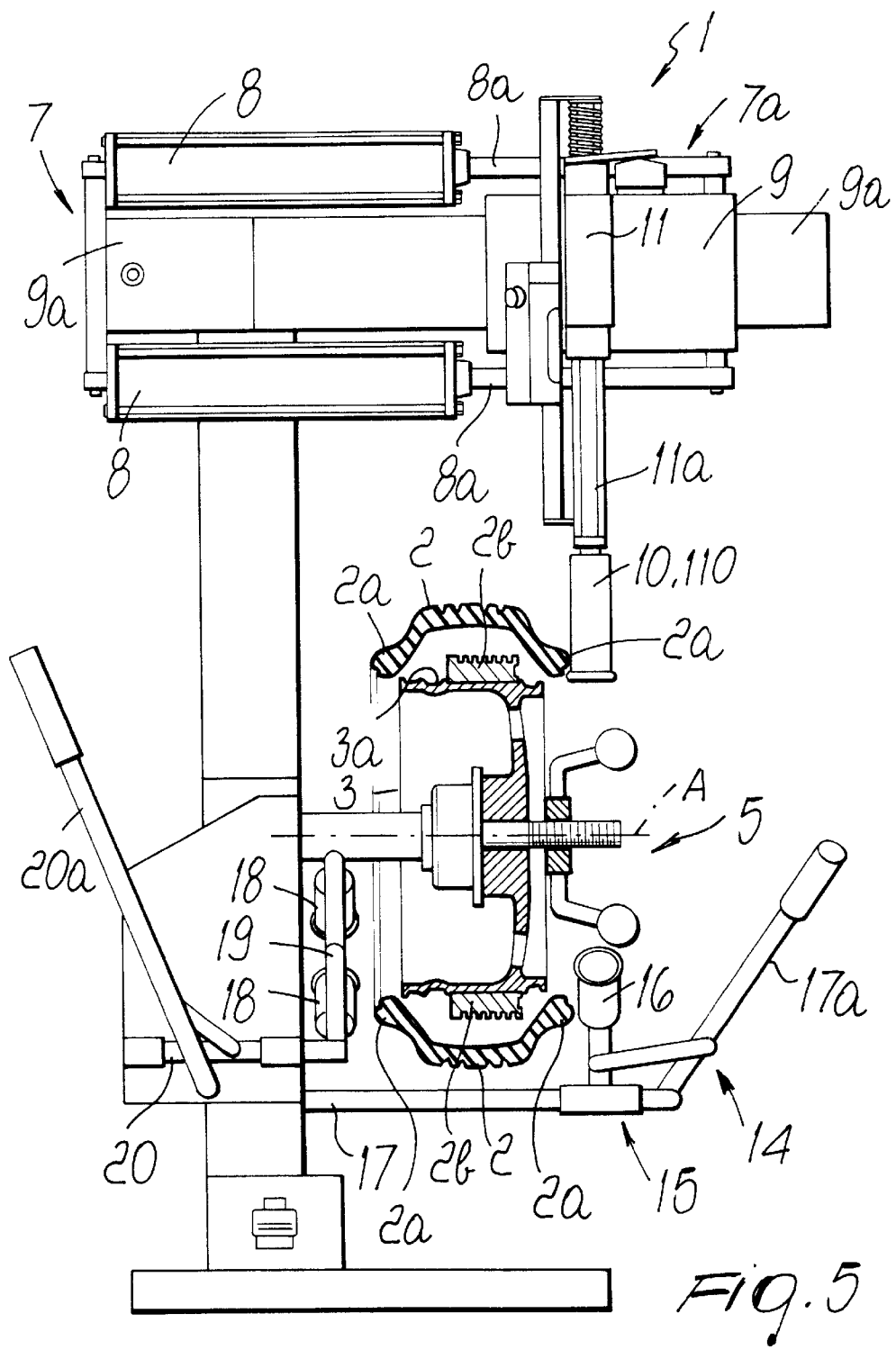
FIGS. 5, 6 and 7 are side views of three steps of the mounting of a special tire on its wheel rim.
Figure 6:
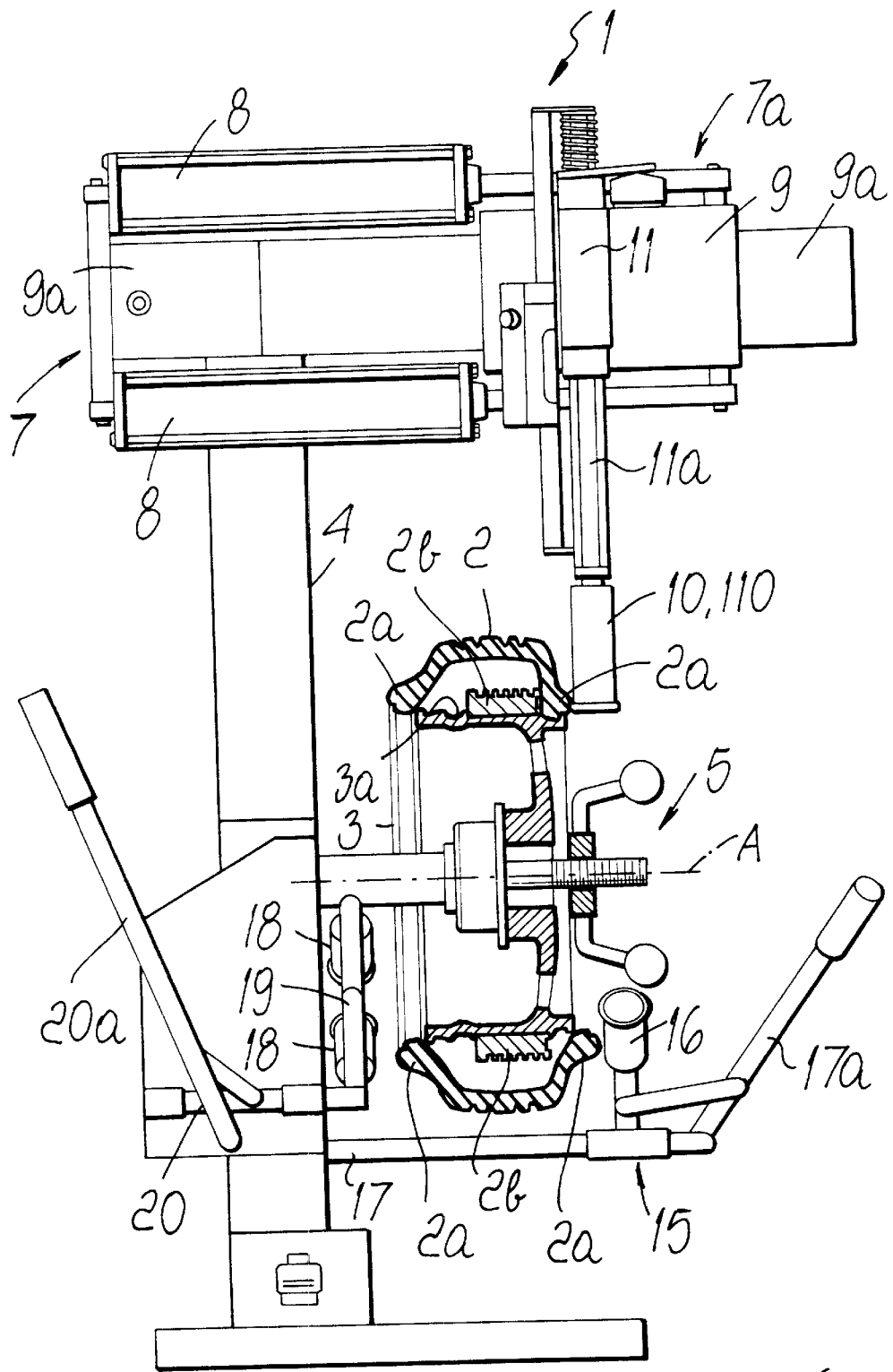
Figure 7:
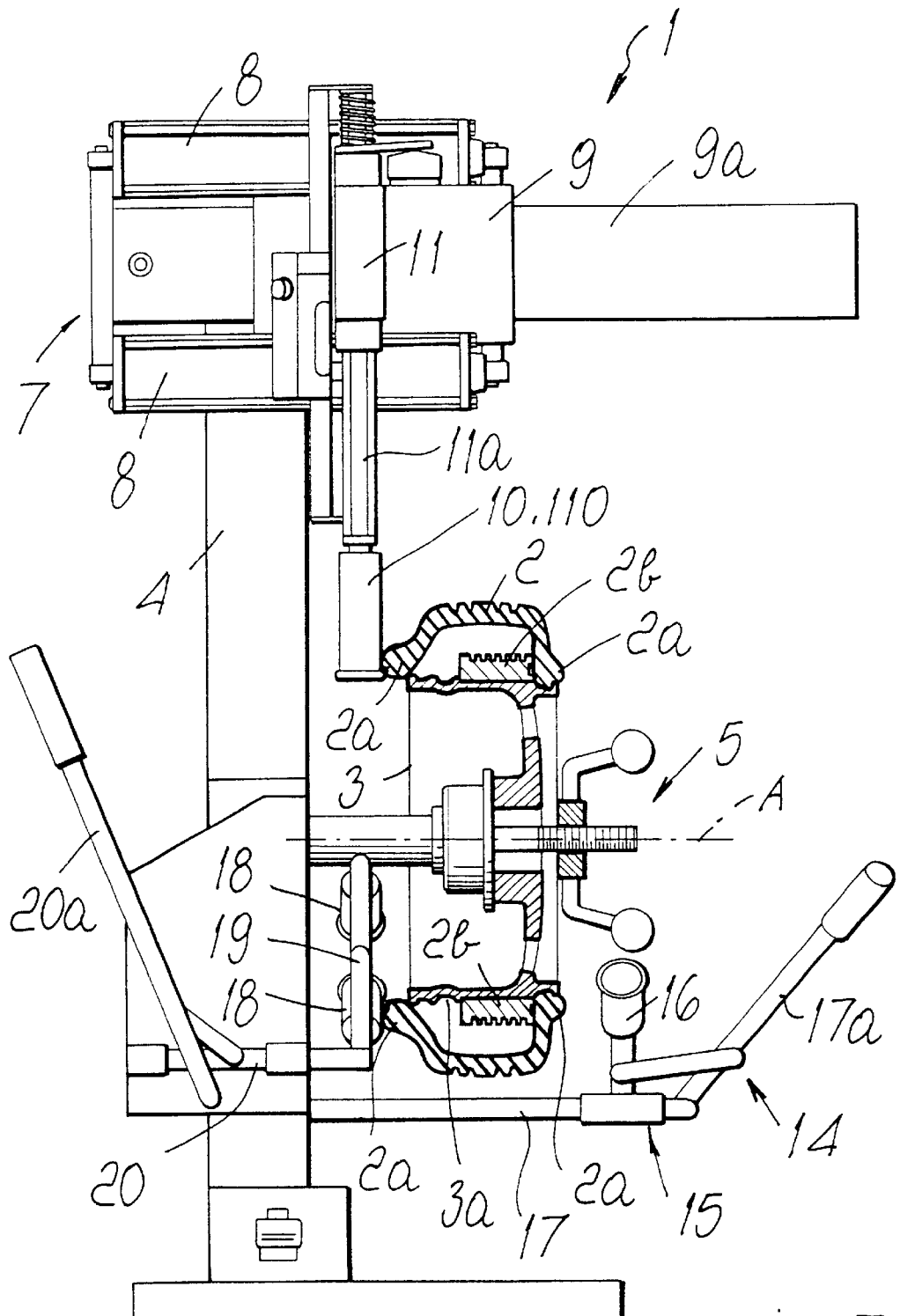

With reference to the above-cited figures, 1 designates a machine for mounting and removing special tires 2 from their wheel rim 3, which is constituted by a floor-mounted turret 4 on which a unit 5 for coupling and turning wheels 6 fitted with special tires 2 is mounted.

At the coupling unit 5, preferably above it, there is a pusher 7 which acts transversely on the beads 2a of the tires 2 and is provided with means 7a for adjusting its intervention position.

The wheels 6 turn about a horizontal axis A which is perpendicular to the turret 4.

The pusher 7 is constituted by two double-acting fluid-driven actuators 8 which have horizontal axes and stems 8a; the free ends of their stems 8a are rigidly coupled to a support 9 which is slidingly mounted on a guide 9a for at least one free roller 10 which has a vertical axis and is adapted to be placed in contact with the beads 2a of the tires 2.

In an alternative embodiment, the roller 10 can be replaced with two rollers 110 which are supported on the support 9 so as to be vertically coplanar and so that their rotation axes B (as shown in FIG. 8) substantially converge towards the unit 5 for coupling and turning the wheels 6.

The rollers 10 can be cylindrical or frustum-shaped, with the larger flat face directed towards the center of the unit 5, for mutual contact with the beads 2a of the tires 2.

The means 7a for adjusting the intervention position of the rollers 10 (110) are constituted by a third double-acting fluid-driven actuator 11 which is mounted so as to have a vertical axis on the support 9; the rollers 10 or 110 is, or are, rigidly coupled to the free end of the stem 11a of the actuator.

The support 9 also supports a lever 12 which is articulated thereto and is provided with a claw 13 for lifting a flap of the bead 2a of the tire 2 when it is mounted on the coupling and rotation unit 5.

In a substantially opposite position with respect to the roller 10 (pair of rollers 110) relative to the unit 5 it is possible to fit a complementary presser 14 for the beads 2a, whose position can be adjusted through corresponding manual or automatic means 15; the complementary presser 14 is constituted, for the outer side of the wheel 6, by an additional roller 16 which is supported so that it can rotate freely with a vertical rotation axis and can be slidingly arranged on a supporting bar 17 which protrudes at right angles from the floor-mounted turret 4 and is provided with an operating handle 17a. For the inner side, there is an additional pair of rollers 18 which are freely mounted with converging axes 18a on a corresponding support 19 which is in turn mounted so that it can slide on a second bar 20 supported by the turret 4 and also provided with an operating handle 20a.

The additional pair of rollers 18 constitutes a presser arranged so as to operate in cooperation with the pusher device 7.

The operation of the invention is as follows: a wheel 6, composed of a special tire 2 mounted on an adapted wheel rim 3, is fitted on the coupling and rotation means 5 in a conventional way.

During the removal of the deflated tire 2, the actuators 8 move the support 9 horizontally until the roller 10, or the pair of rollers 110, rest tangentially against the outer bead 2a of the tire 2, as a first pushing position.

The vertical actuator 11 further arranges the rollers 10 (110) accordingly.

The unit 5 then turns the wheel 6 and the actuators apply progressive traction until the rollers 10 (110) separate the bead 2a from the edge of the wheel rim 3 over an angular segment, pushing the bead towards the internal channel 3a of the wheel rim.

Rotation is interrupted and an operator then acts on the lever 12 and wedges the claw 13 between the bead 2a and the edge of the wheel rim 3, raising it; at the same time, the actuators 8 and 11 move the roller 10 (or rollers 110) on the inner side of the wheel 6, placing them in contact with the corresponding upper part of the inner bead 2a, at a second pushing position. The unit 5 is turned again and the actuators 8 apply a transverse outward thrust together with an operator who, by acting on the handle 20a, presses the pusher constituted by the pair of rollers 18 tangentially against the lower region of the inner bead.

In this manner, separation along the entire circumference is completed and the tire 2 is removed from the wheel 3 together with the inner ring 2b.

In the complementary operation for mounting the tire 2 on the wheel rim 3, the tire is placed on the unit 5 in the conventional manner; first of all, the ring 2b is fitted thereon, then the deflated tire 2 is loosely fitted thereon.

By means of the actuators 8 and 11, the roller 10 (or rollers 110) are then placed against the upper part of the outer bead 2a; in a substantially opposite position, the operator, by acting on the handle 17a, places and keeps the roller 16 pressed against the outer lower part of the bead 2a; then the unit 5 is turned and the transverse pressure applied in combination by the rollers 10 (110) and 16 causes the outer bead 2a to gradually enter the channel 3a of the wheel rim 3.

Once the insertion of the outer bead has been completed, the rotation of the unit 5 is stopped, the rollers 10 (110) are returned into pressing contact with the inner bead 2a, and one proceeds in a similar manner, pushing the bead into the channel 3a, using, for the lower region of the wheel 6, the pair of rollers 18, which are kept pressed, again tangentially, against the bead 2a by the operator, who acts on the handle 20a.

Once the above-mentioned operations have been completed, the tire 2 is inflated so as to make the beads 2a adhere to the respective sidewalls of the wheel rim 3 and then the wheel 6 is removed from the unit 5.

Thanks to the structure of the machine 1, the machine can also be used for mounting and removing conventional tires, taking care to repeat the above-described operations for both sides of a wheel.

In practice it has been observed that the above-described invention achieves the intended aim and object.

The invention thus conceived is susceptible of numerous modifications and variations, all of which are within the scope of the inventive concept. Thus, for example, the rollers 16 and 18 can be actuated not only manually but also automatically by using additional fluid-driven actuators.

All the details may further be replaced with other technically equivalent ones.

In practice, the materials employed, as well as the shapes and the dimensions, may be any according to requirements without thereby abandoning the scope of the protection of the appended claims.

The disclosures in Italian Patent Application No. MO99A000015 from which this application claims priority are incorporated herein by reference.

What is claimed is:

1. A machine for mounting and removing a special tire on and, respectively, from a wheel which has a first, inner rim edge for retaining an inner bead of the special tire and a second, outer rim edge for retaining an outer bead of the special tire, the machine comprising: a floor-mounted turret extending along an axis thereof, a coupling unit supported at said turret for coupling and turning the wheel, in a wheel lying plane, during tire mounting and removal; a pusher device, supported at said turret for pushing transversally to said wheel lying plane, either at a first pushing position located at the outer bead of the tire or at a second pushing position located at the inner bead of the tire; position adjustment means for positioning said pusher device at said first and second pushing positions; a lever arrangeable for operation in cooperation with said pusher device to lift a bead flap of the tire from outer rim edge of the wheel; a presser arranged so as to operate in cooperation with said pusher device for pressing at a position at the inner bead of the tire which is substantially diametrically opposed to the second pushing position of the pusher device; and a complementary presser arranged so as to operate in cooperation with said pusher device for pressing at a position of the outer bead of the tire which is substantially diametrically opposed to the first pushing position of the pushing device.

2. The machine of claim 1 wherein said turret is vertical and said coupling unit is supported at said turret so as to turn about a horizontal axis which is perpendicular to the turret.

3. The Machine of claim 1 wherein said position adjustment means comprises a guiding means supported at said turret and extending along a guiding direction; a movable support mounted for sliding movement on said guiding means along said guiding direction; double-acting fluid driven actuators having stems with free ends thereof rigidly coupled to said movable support for actuation thereof; at least one pusher roller which is freely rotatable about an axis thereof arranged in a plane being substantially parallel to the lying plane of the wheel, said at least one roller being arrangeable in tangential rotary contact with the outer and inner beads of the tire at said first and second pushing positions.

4. The machine of claim 3 comprising a pair of pusher rollers which are arranged so as to be freely rotatable about rotation axes thereof lying in a plane arrangement which is substantially parallel to the lying plane of the wheel, said roller rotation axes being arranged in said arrangement plane so as to converge substantially towards a turning center of said coupling unit.

5. The machine of claim 3 wherein said at least one roller is frustum-shaped with a larger flat face thereof directed so as to lie adjacent to the tire beads and cause, upon pushing action of said pusher device, a movement of the tire bead away from the wheel rim edge.

6. The machine of claim 3 wherein said double-acting fluid-driven actuators comprise two actuators for moving said movable support along said guide means, and a third actuator mounted to act along a direction perpendicular to said guiding direction, said at least one roller being rigidly coupled to a free end of a stem of said third actuator.

7. The machine of claim 1 wherein said lever is articulated to said movable support and is provided with a claw for lifting the bead flap of the tire.

8. The machine of claim 1 further comprising any of a manual and an automatic actuation means for adjustably positioning said complementary presser at selected pressing positions.

9. The machine of claim 1 wherein said complementary presser comprises a first bar which protrudes at right angles from said floor-mounted turret; an operating handle provided at said first bar, and a freely rotatable additional roller which is supported on and slidable along said first bar.

10. The machine of claim 9 wherein said presser comprises a second bar which lies opposite said first bar and is supported at said turret; an operating handle provided at said second bar; a roller support which is slidable along said second bar; and an additional pair of freely rotatable rollers having axes which converge towards said roller support.

11. The machine of claim 2 wherein a median-upper portion of said turret is inclined towards a rear part of said machine.

12. A machine for mounting and removing a special tire on and, respectively, from a wheel which has a first, inner rim edge for retaining an inner bead of the special tire and a second, outer rim edge for retaining an outer bead of the special tire, the machine comprising: a floor-mounted turret extending along an axis thereof; a coupling unit supported at said turret for coupling and turning the wheel, in a wheel lying plane, during tire mounting and removal; a pusher device, supported at said turret, for pushing transversally to said wheel lying plane, either at a first pushing position located at the outer bead of the tire or a second pushing position located at the inner bead of the tire which is substantially diametrically opposed to the second pushing position of the pusher device; and a complementary presser arranged so as to operate in cooperation with said pusher device for pressing at a position of the outer bead of the tire which is substantially diametrically opposed to the first pushing position of the pushing device.

13. The machine of claim 12 further comprising a lever arrangeable for operation in cooperation with said pusher to lift a bead flap of the tire from the outer rim edge of the wheel.

14. The machine of claim 13 wherein said lever is articulated to said movable support and is provided with a claw for lifting the bead flap of the tire.

15. The machine of claim 12 wherein said position adjustment means comprises guiding means supported at said turret and extending along a guiding direction; a movable support mounted for sliding movement on said guiding means along said guiding direction; double-acting fluid-driven actuators having stems with free ends thereof rigidly coupled to said movable support for actuation thereof; at least one pusher roller which is freely rotatable about an axis thereof arranged in a plane being substantially parallel to the lying plane of the wheel, said at least one roller being arrangeable in tangential rotary contact with the outer and inner beads of the tire at said first and second pushing positions.

16. The machine of claim 15 comprising a pair of pusher rollers which are arranged so as to be freely rotatable about rotation axes thereof lying in a plane of arrangement which is substantially parallel to the lying plane of the wheel, said roller rotation axes being arranged in said arrangement plane so as to converge substantially towards a turning center of said coupling unit.

* * * * *